(12) United States Patent
Murata et al.

(10) Patent No.: US 10,276,895 B2
(45) Date of Patent: Apr. 30, 2019

(54) POSITIVE ELECTRODE GRID FOR LEAD ACID BATTERIES AND METHOD FOR PRODUCING THE SAME, AND LEAD ACID BATTERY

(71) Applicant: PANASONIC INTELLECTUAL PROPERTY MANAGEMENT CO., LTD., Osaka (JP)

(72) Inventors: Tetsuyuki Murata, Osaka (JP); Hideharu Takezawa, Osaka (JP); Kazunari Ando, Shizuoka (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 15/541,890

(22) PCT Filed: Dec. 18, 2015

(86) PCT No.: PCT/JP2015/006316
§ 371 (c)(1),
(2) Date: Jul. 6, 2017

(87) PCT Pub. No.: WO2016/110907
PCT Pub. Date: Jul. 14, 2016

(65) Prior Publication Data
US 2018/0006334 A1 Jan. 4, 2018

(30) Foreign Application Priority Data
Jan. 8, 2015 (JP) .................................. 2015-002308

(51) Int. Cl.
*H01M 4/02* (2006.01)
*H01M 10/08* (2006.01)
*C22C 11/06* (2006.01)
*H01M 4/73* (2006.01)
*H01M 4/38* (2006.01)

(52) U.S. Cl.
CPC ............. *H01M 10/08* (2013.01); *C22C 11/06* (2013.01); *H01M 4/38* (2013.01); *H01M 4/73* (2013.01); *H01M 2004/028* (2013.01)

(58) Field of Classification Search
CPC ...................................................... H01M 4/02
See application file for complete search history.

(56) References Cited

U.S. PATENT DOCUMENTS

2014/0377628 A1* 12/2014 Nandi ................... H01M 2/162
429/144

FOREIGN PATENT DOCUMENTS

| JP | 2001-110426 | * | 4/2001 |
| JP | 2001110426 A2 | | 4/2001 |
| JP | 2002222662 A2 | | 8/2002 |

(Continued)

OTHER PUBLICATIONS

International Search Report dated Mar. 15, 2016 filed in PCT/JP2015/006316.

*Primary Examiner* — Jacob B Marks
(74) *Attorney, Agent, or Firm* — Rankin, Hill & Clark LLP (57) ABSTRACT

An objective is to improve the corrosion resistance of a positive electrode grid for lead acid batteries.
Provided is a positive electrode grid for lead acid batteries, and a lead acid battery including the grid. The grid includes a lead alloy containing calcium and tin. The lead alloy has a calcium content of 0.10 mass % or less, and a tin content of 2.3 mass % or less, and a lattice constant of 4.9470 Å or less.

4 Claims, 3 Drawing Sheets

(56) References Cited

FOREIGN PATENT DOCUMENTS

JP    2005050673    2/2005
JP    2013122838 A2    6/2013

* cited by examiner

Relationship between Sn content and lattice constant

POSITIVE ELECTRODE GRID FOR LEAD ACID BATTERIES AND METHOD FOR PRODUCING THE SAME, AND LEAD ACID BATTERY

TECHNICAL FIELD

The present invention relates to a lead acid battery, particularly to a positive electrode grid for lead acid batteries, the grid including a lead alloy containing calcium and tin, and a method for producing the grid.

BACKGROUND ART

Lead acid batteries are inexpensive and, due to their comparatively high battery voltage, can provide high power. Because of these features, they have been used in various applications. Lead acid batteries are required to reduce, as much as possible, their self-discharge and loss of water from electrolyte. In view of this, a lead-calcium alloy that does not contain antimony is used for a grid in positive and negative electrode plates because antimony increases self-discharge and loss of water. Adding tin to the lead-calcium alloy can enhance the corrosion resistance of the grid.

Conventionally, the grid for lead acid batteries has been produced, for example, by expanding a lead-alloy sheet obtained by continuous casting. Continuous casting is a process in which a molten lead alloy is poured into contact with a roll mold and solidified. It is known, however, that the lead-alloy sheet obtained by this process results in a double layer structure, due to the difference of the alloy structure between where the molten metal contacts the roll mold and where it contacts the air. A positive electrode grid obtained from such lead-alloy sheet does not have sufficient corrosion resistance and fatigue strength.

Patent Literature 1 discloses to produce a lead-alloy sheet by continuously extruding a lead alloy at a temperature 10 to 100° C. lower than its melting point, and then rolling the alloy while cooling slowly at a temperature 50 to 230° C. lower than the melting point.

CITATION LIST

Patent Literature

[PTL 1] Japanese Laid-Open Patent Publication No. 2005-50673

SUMMARY OF INVENTION

Technical Problem

According to the method of extruding a lead alloy as disclosed by Patent Literature 1, however, it is difficult to improve the corrosion resistance sufficiently. One possible reason for this is as follows. A lead alloy used as raw material for extrusion is in the form of a slab or billett obtained by typical casting techniques and has a heterogeneous structure. In the method of extruding such lead alloy at a temperature lower than its melting point and cooling it slowly while rolling, segregation of tin may occur, and tin atoms and calcium atoms may fail to be incorporated sufficiently into the crystal lattice of the lead alloy.

Solution to Problem

In view of the above, one aspect of the present invention relates to a positive electrode grid for lead acid batteries, the positive electrode grid including a lead alloy containing calcium and tin. The lead alloy has a calcium content of 0.10 mass % or less, a tin content of 2.3 mass % or less, and a lattice constant of 4.9470 Å or less.

Another aspect of the present invention relates to a method for producing a positive electrode grid for lead acid batteries. The method includes steps of: (i) obtaining a lead-alloy slab by continuous slab casting, from a molten lead alloy containing calcium and tin, the lead alloy having a calcium content of 0.10 mass % or less and a tin content of 2.3 mass % or less; (ii) rolling the lead-alloy slab by multistage rolling, to obtain a lead-alloy sheet; and (iii) expanding the lead-alloy sheet, to obtain a positive electrode grid.

Yet another aspect of the present invention relates to a lead acid battery including: a positive electrode plate, a negative electrode plate, a separator interposed between the positive electrode plate and the negative electrode plate, and an electrolyte including an aqueous sulfuric acid solution. The positive electrode plate includes the above positive electrode grid.

Advantageous Effects of Invention

According to the present invention, it is possible to improve the corrosion resistance of a positive electrode grid for lead acid batteries.

DESCRIPTION OF EMBODIMENTS

A positive electrode grid for lead acid batteries according to an embodiment of the present invention is obtained by expanding a sheet of lead alloy containing calcium and tin (hereinafter, Pb—Ca—Sn alloy). Calcium (Ca) mainly improves the mechanical strength of the lead alloy, and tin (Sn) mainly improves the corrosion resistance of the lead alloy. The Pb—Ca—Sn alloy has a calcium content of 0.10 mass % or less, and a tin content of 2.3 mass % or less.

The tin content in the Pb—Ca—Sn alloy influences the lattice constant of the Pb—Ca—Sn alloy. The higher the tin content is, the smaller the lattice constant of the Pb—Ca—Sn alloy becomes. With the decrease of the lattice constant of the Pb—Ca—Sn alloy, the corrosion resistance of the Pb—Ca—Sn alloy tends to improve. This tendency is remarkable when the lattice constant of the Pb—Ca—Sn alloy is 4.9470 Å or less.

Figure 5:
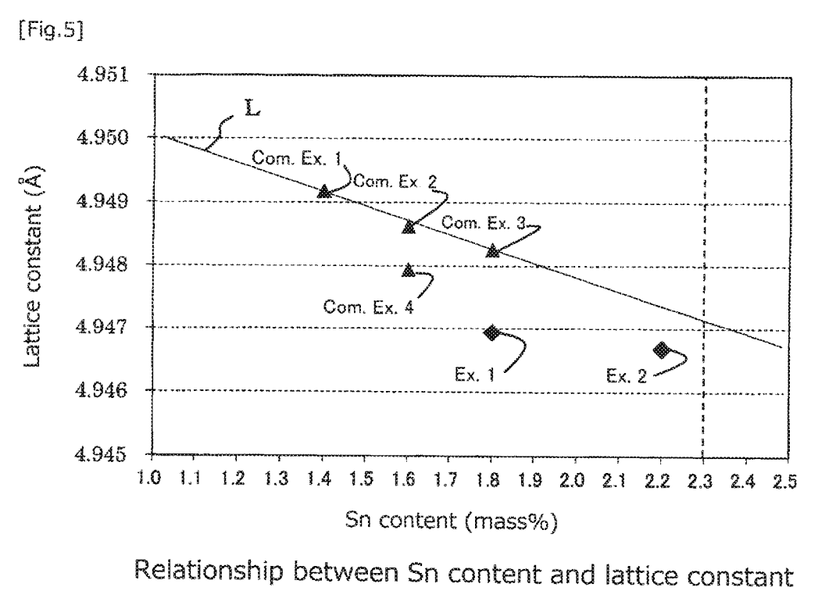
FIG. 5 A graph showing the relationship between the tin content and the lattice constant in lead alloys.

With the conventional positive electrode grid production method of extruding a lead alloy used as raw material at a temperature lower than its melting point, followed by slowly cooling while rolling, however, it is difficult to decrease the lattice constant of the positive electrode grid to 4.9470 Å or less. The relationship between the lattice constant of a positive electrode grid obtained by such method and the tin content can be represented by a primary straight line like straight line L of FIG. 5. As shown in FIG. 5, the lattice constant usually exceeds 4.9470 Å in the region where the tin content in the Pb—Ca—Sn alloy is 2.3 mass % or less.

In order to decrease the lattice constant, it is necessary to increase the tin content in the Pb—Ca—Sn alloy. In general, in order to decrease the lattice constant of the Pb—Ca—Sn alloy to 4.9470 Å or less, it is necessary to increase the tin content to higher than 2.3 mass %. In other words, it is necessary to allow the Pb—Ca—Sn alloy to contain tin in an amount close to or more than its solid-solubility limit to lead (approx. 2.5 mass %). Tin, however, is very expensive as compared with lead. Therefore, in view of reducing the production cost, desirably, the amount of tin contained in the Pb—Ca—Sn alloy is reduced as much as possible.

When using a molten Pb—Ca—Sn alloy having a tin content of 2.3 mass % or less, it becomes possible to decrease the lattice constant of the Pb—Ca—Sn alloy to 4.9470 Å or less, by subjecting the Pb—Ca—Sn alloy through continuous slab casting into a slab and then rolling the slab through multistage rolling.

With the decrease of the lattice constant of the Pb—Ca—Sn alloy, the Vickers hardness (HV) also tends to increase. The increase in the Vickers hardness suppresses the deformation of the positive electrode grid. In other words, by decreasing the lattice constant of the Pb—Ca—Sn alloy constituting the positive electrode grid, the corrosion and the deformation of the positive electrode grid that occur in association with charge-discharge cycling of the lead acid battery can be suppressed. The Vickers hardness Hv of the Pb—Ca—Sn alloy is preferably 8 or more, and more preferably 10 or more. This can more effectively suppress the deformation of the positive electrode grid associated with charge-discharge cycling.

The tin content in the Pb—Ca—Sn alloy is preferably more than 1.6 mass %, more preferably 1.7 mass % or more, and more preferably 1.8 mass % or more. This makes it possible to more easily decrease the lattice constant of the Pb—Ca—Sn alloy to 4.9470 Å or less. On the other hand, the tin content in the Pb—Ca—Sn alloy is 2.3 mass % or less, preferably 2.2 mass % or less, and more preferably 2.1 mass % or less. This makes it possible to maintain the corrosion resistance, as well as to reduce the production cost of the Pb—Ca—Sn alloy. The above upper and lower limits of the tin content can be combined in any combination.

The calcium content in the Pb—Ca—Sn alloy is preferably 0.01 mass % or more, and more preferably 0.02 mass % or more. This can easily provide the Pb—Ca—Sn alloy with sufficient mechanical strength. On the other hand, the calcium content in the Pb—Ca—Sn alloy is preferably 0.10 mass % or less, and more preferably 0.07 mass % or less. This can easily improve the corrosion resistance of the Pb—Ca—Sn alloy. The above upper and lower limits of the calcium content can be combined in any combination.

The Pb—Ca—Sn alloy may contain a very small amount of a third element other than lead, calcium and tin. The third element content is desirably 0.01 mass % or less, and more desirably 0.005 mass % or less. Examples of the third element include bismuth, silver, barium, and aluminum. These may be contained singly or in combination of two or more in the Pb—Ca—Sn alloy. In view of suppressing the self-discharge, the Pb—Ca—Sn alloy is desirably substantially free of antimony (Sb), and the antimony content in the Pb—Ca—Sn alloy is desirably 0.001 mass % or less.

The positive electrode grid may have, if necessary, two or more lead-alloy layers differing in composition. For example, at the portion where the positive electrode grid retains the positive electrode active material, in view of suppressing the deterioration of the positive electrode active material, a lead-alloy layer containing a very small amount of Sb may be provided. It is noted, however, that 97.5 mass % or more of the positive electrode grid is desirably occupied by a Pb—Ca—Sn alloy having a calcium content of 0.10 mass % or less, a tin content of 2.3 mass % or less, and a lattice constant of 4.947 Å or less.

A detailed description of embodiments of the present invention is given below with reference to drawings.

Figure 1:
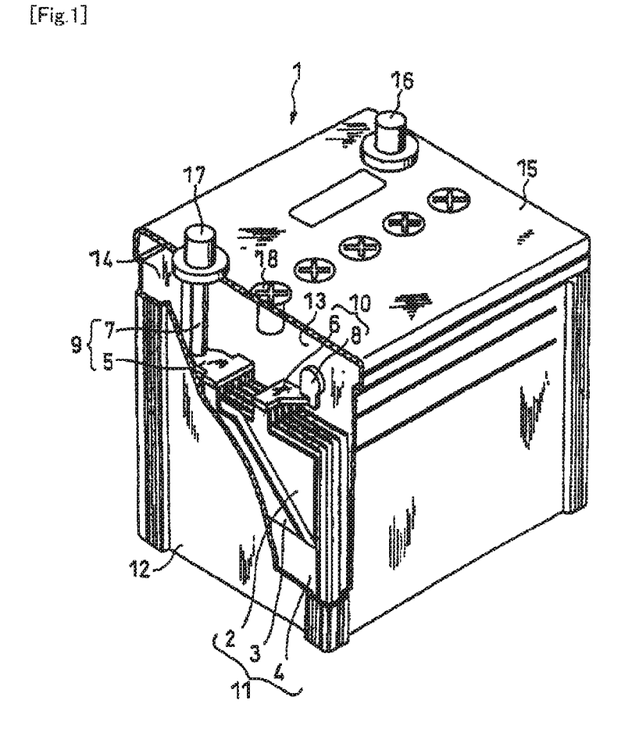
FIG. 1 A partially cut-away oblique view of a lead acid battery according to one embodiment of the present invention.

FIG. 1 is a partially cut-away oblique view of a lead acid battery according to one embodiment of the present invention. A lead acid battery 1 includes an electrode plate group 11 and an electrolyte (not shown), which are contained in a battery container 12. The battery container 12 is divided into a plurality of cell chambers 14 by partitions 13. Each cell chamber 14 accommodates one electrode plate group 11 together with the electrolyte. The electrode plate group 11 comprises positive electrode plates 2 and negative electrode plates 3 stacked alternately one on another, with a separator 4 interposed therebetween.

(Positive Electrode Plate)

Figure 2:
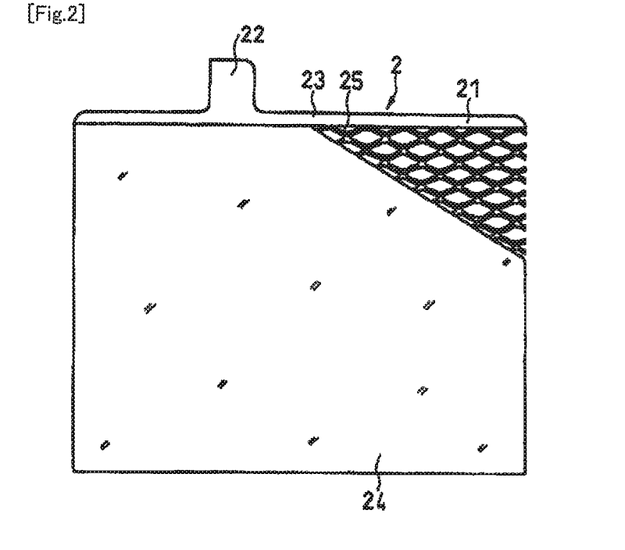
FIG. 2 A front view of a positive electrode plate in the lead acid battery of FIG. 1.

FIG. 2 is a front view of the positive electrode plate 2. The positive electrode plate 2 includes a positive electrode grid 21 having a tab 22, and a positive electrode active material layer (or positive electrode material mixture layer) 24 retained by the positive electrode grid 21. The positive electrode plate 2 is connected to a positive electrode connecting member 10 via the tab 22. The positive electrode connecting member 10 includes a positive electrode strap 6 connected to the tab 22 of the positive electrode grid 21, and a positive electrode connector 8 or positive electrode post provided at the positive electrode strap 6. The positive electrode grid 21 is made of a Pb—Ca—Sn alloy, and is an expanded grid which comprises an expanded mesh 25 retaining the positive electrode active material layer 24, a frame rib 23 provided at the upper end of the expanded mesh 25, and the tab 22 provided contiguously to the frame rib 23.

Lead oxide ($PbO_2$) is used as the positive electrode active material. In producing the positive electrode plate 2, a lead powder that includes lead oxide as the positive electrode active material may be used. The positive electrode material mixture may include, in addition to the positive electrode active material, an electrically conducting material (e.g., conductive carbonaceous material such as carbon black), and/or a binder (e.g. polymer). The positive electrode material mixture may include other known additives, if necessary.

The positive electrode plate 2 can be obtained by filling or applying a positive electrode paste (positive electrode active material-containing paste or positive electrode material mixture paste) into or onto the positive electrode grid, and drying the paste to obtain the positive electrode plate 2 in an unformed state, followed by performing chemical formation. The positive electrode paste includes, in addition to the positive electrode active material or positive electrode material mixture, a dispersion medium, for example, sulfuric acid and/or water. Drying can be performed under known conditions.

Chemical formation can be performed by allowing charging to proceed in the battery container of a lead acid battery, with the positive electrode plate 2 and a negative electrode plate 3, both in an unformed state, immersed in the electrolyte including an aqueous sulfuric acid solution. Chemical formation may be performed before the fabrication of a battery or an electrode plate group, if necessary.

(Negative Electrode Plate)

Figure 3:
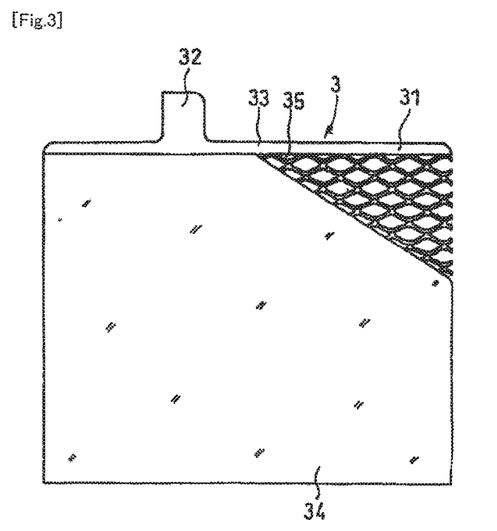
FIG. 3 A front view of a negative electrode plate in the lead acid battery of FIG. 1.

FIG. 3 is a front view of the negative electrode plate 3. Like the positive electrode plate 2, the negative electrode plate 3 includes a negative electrode grid 31 having a tab 32, and a negative electrode active material layer (or negative electrode material mixture layer) 34 retained by the negative electrode grid 31. The negative electrode plate 3 is connected to a negative electrode connecting member 9 via the tab 32. The negative electrode connecting member 9 includes a negative electrode strap 5 connected to the tab 32 of the negative electrode grid, and a negative electrode post 7 or negative electrode connector provided at the negative electrode strap 5. The negative electrode grid 31 is an expanded grid which comprises an expanded mesh 35 retaining the negative electrode active material layer 34, a frame rib 33 provided at the upper end of the expanded mesh 35, and the tab 32 provided contiguously to the frame rib 33.

Lead is used as the negative electrode active material. In producing the negative electrode plate 3, a lead powder can be used. The lead powder may contain lead oxide. The negative electrode material mixture may include an expander (e.g., lignin and/or barium sulfate), an electrically conducting material (e.g., conductive carbonaceous material such as carbon black), and/or a binder (e.g. polymer). The negative electrode material mixture may include other known additives, if necessary. The negative electrode plate 3 can be obtained in a similar manner to the positive electrode plate 2.

The negative electrode grid can be obtained by expanding a lead-alloy sheet. The lattice constant of the lead alloy constituting the negative electrode grid is not particularly limited. The calcium content in the lead alloy constituting the negative electrode grid is also not particularly limited, but is, for example, 0.01 to 0.10 mass %, or 0.02 to 0.07 mass %. The tin content in the lead alloy constituting the negative electrode grid is also not particularly limited, but is, for example, 0.2 to 0.6 mass %. The negative electrode grid may have, if necessary, two or more lead-alloy layers differing in composition.

In the illustrated example, at one end of the battery container 12, the positive electrode connector 8 is connected to the positive electrode strap 6, and the negative electrode post 7 is connected to the negative electrode strap 5. At the other end of the battery container 12, the positive electrode post is connected to the positive electrode strap 6, and the negative electrode connector is connected to the negative electrode strap 5.

In each cell chamber 14, the positive electrode strap 6, the negative electrode strap 5 and the electrode plate group 11 are entirely immersed in the electrolyte. A lid 15 provided with a positive electrode terminal 16 and a negative electrode terminal 17 is attached to the opening of the battery container 12. The positive electrode connector 8 is connected, via a through-hole provided in the partition 13, to the negative electrode connector provided contiguously to the negative electrode strap 5 of the electrode plate group 11 in the adjoining cell chamber 14. In this way, the electrode plate group 11 is connected in series to the electrode plate group 11 in the adjoining cell chamber 14. At one end of the battery container 12, the negative electrode post 7 is connected to the negative electrode terminal 17, and at the other end, the positive electrode post is connected to the positive electrode terminal 16. Liquid inlets provided in the lid 15 are fitted with a vent cap 18 having a ventilation hole for discharging gas generated inside the battery to outside.

(Separator)

The separator is, for example, a macroporous film or a fiber sheet (or mat). The macroporous film or the fiber sheet preferably comprises a polymer material having acid resistance, for example, a polyolefin such as polyethylene or polypropylene. The fiber sheet may be composed of polymer fibers (fibers made of the above-mentioned polymer material) and/or inorganic fibers such as glass fibers. The separator may include a filler and/or an additive such as carbon, if necessary.

(Electrolyte)

The electrolyte includes an aqueous sulfuric acid solution. The density of the electrolyte is, for example, 1.1 to 1.35 $g/cm^3$, preferably 1.2 to 1.35 $g/cm^3$, and more preferably 1.25 to 1.3 $g/cm^3$. It is noted that, in the present specification, the density of the electrolyte refers to a density at 20° C., and the density of the electrolyte in a fully charged battery is desirably within the range above.

The lead acid battery can be fabricated by placing the electrode plate group and the electrolyte into the battery container. The electrode plate group can be fabricated by stacking a plurality of the positive electrode plates and the negative electrode plates, with the separator interposed therebetween, such that the positive electrode plate and the negative electrode plate are alternately arranged. Since it is only required that the separator is interposed between the positive electrode plate and the negative electrode plate, a bag-shaped separator or a sheet of separator folded in half (U-shaped) may be used by inserting one of the electrodes inside, and stacking the separator on the other electrode. Two or more electrode plate groups may be placed into the battery container.

Figure 4:
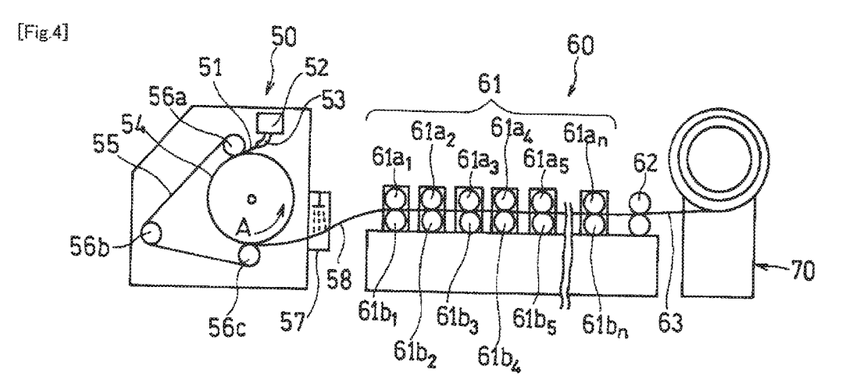
FIG. 4 An explanatory diagram schematically showing a production process of a lead-alloy sheet.

Next, a production method of a positive electrode grid for lead acid batteries according to an embodiment of the present invention is described with reference to FIG. 4. FIG. 4 schematically shows a production process of a lead-alloy sheet to be expanded.

Step (i)

First, a lead-alloy slab is obtained by continuous slab casting, from a molten lead alloy containing calcium and tin in which the calcium content is 0.10 mass % or less and the tin content is 2.3 mass % or less. The composition of the molten lead alloy is determined depending on the Pb—Ca—Sn alloy constituting a desired positive electrode grid.

As shown in FIG. 4, the lead-alloy slab is continuously produced in a casting machine 50. The casting machine 50 includes a molten metal bath 52 containing a molten metal 51 of lead alloy, a chute 53 for feeding the molten metal 51 from the molten metal bath 52 to a wheel-type mold 54, a steel belt 55 moving along the half-circumferential face of the mold 54 in the direction of rotation of the mold 54, and driving rollers 56a, 56b and 56c for moving the steel belt 55. The mold 54 rotates in the direction indicated by allow A in the figure. The molten metal 51 between the mold 54 and the steel belt 55 is cooled on the circumferential face of the mold 54 and solidifies, which is then continuously carried, as a lead-alloy slab 58, out of the casting machine 50. The lead-alloy slab 58 is further cooled by a cooling unit 57 before and after carried out of the machine. The cooling unit 57 is, for example, a shower unit that sprays cooling water. The temperature of the circumferential face of the mold 54 is, for example, 95 to 115° C., and the rotation speed of the mold 54 is, for example, 50 to 75 seconds per revolution.

The temperature of the molten metal immediately before poured onto the mold 54 is, for example, 350 to 370° C. The temperature of the lead-alloy slab 58 released from the mold 54 and before introduced into the cooling unit 57 is, for example, 165 to 185° C. The temperature of the lead-alloy slab 58 cooled by the cooling unit 57 is, for example, 30 to 70° C. In short, the lead alloy is rapidly cooled from a temperature far exceeding 300° C. to near room temperature in 1 minute or so. The thickness of the lead-alloy slab 58 is, for example, approximately 5 to 20 nm, and desirably set to approximately 8 to 13 mm.

Rapidly cooling the lead alloy in a hot molten state to near room temperature can reduce the crystallite size of the lead-alloy slab 58, allowing tin to he efficiently incorporated into the crystal lattice of lead. As a result, the lattice constant of the lead alloy in a lead-alloy sheet after rolling can be as small as 4.9470 Å or less. Moreover, rapidly cooling the lead alloy can shorten the contacting time between the hot lead alloy and the air, and thus the alloy structure tends to be homogeneous. The cooling speed of the lead alloy is preferably 3° C./sec or more, and more preferably 5° C./sec or more. In view of improving the homogeneity of the alloy structure, the atmospheric pressure in the casting machine 50 may be reduced, or an inert gas such as argon or nitrogen may be introduced into the casting machine 50.

Step (ii)

Next, the lead-alloy slab 58 is pressed by multistage rolling, and collected as a lead-alloy sheet. More specifically, as shown in FIG. 4, after passing through a multistage rolling machine 60 provided with a plurality pairs of rolling rollers 61 (first rollers $61a_1$ and $61b_1$, second rollers $61a_2$ and $61b_2$, ... $n^{th}$ rollers $61a_n$ and $61b_n$), the lead-alloy slab is collected as a lead-alloy sheet 63 having a predetermined thickness by a take-up unit 70. The lead-alloy sheet 63 is cut, before collected, in a predetermined width by a trimming cutter 62. The thickness of the lead-alloy sheet 63 is usually set to approximately 0.5 mm to 1.5 mm.

A rolling rate every passage between a pair of the rollers $61a_n$ and $61b_n$ is preferably 15 to 30%. The rolling rate can be determined by the following equation.

Rolling rate (%)=(Thickness $T_i$ before rolling−Thickness $T_{i+1}$ after rolling)/(Thickness $T_i$ before rolling)×100

An overall rolling rate after passage between all pairs of the rolling rollers 61 is preferably 60 to 95%. The overall rolling rate can be determined by the following equation. The number (n) of pairs of rollers is desirably 6 to 10 pairs.

Overall rolling rate (%)=(Initial thickness $T_0$ of lead-alloy slab−Thickness $T_n$ after passage of final pair of rollers)/(Initial thickness $T_0$)×100

Step (iii)

Next, the lead-alloy sheet is expanded, to obtain a positive electrode grid (expanded grid). In the expanding process, a large number of slits are cut in parallel to each other in a staggered pattern in the lead-alloy sheet, and then, the slits are expanded. In this way, the lead-alloy sheet is shaped like a mesh.

The present invention will now be described below with reference to Examples and Comparative Examples. The present invention, however, should not be construed to be limited to the following Examples.

EXAMPLE 1

(1) Fabrication of Positive Electrode Plate

A positive electrode plate 2 as shown in FIG. 2 was fabricated as follows.

A raw material powder (a mixture of lead and an oxide of lead), water, and dilute sulfuric acid (density: 1.40 q/cm$^3$) were mixed in a mass ratio of 100:15:5, to obtain a positive electrode paste.

The above-described continuous slab casting, multistage rolling, and expanding processes were performed under the following conditions to obtain a positive electrode grid of Pb—Ca—Sn alloy. The tin content in the Pb—Ca—Sn alloy was adjusted to 1.8 mass %, and the calcium content to 0.05 mass %.

<Continuous Slab Process>

Temperature of peripheral face of mold 54: approx. 100° C.

Rotation speed of mold 54: 55 sec/rev.

Temperature of molten metal immediately before poured onto mold 54: 360° C.

Temperature of lead-alloy slab 58 before introduced into cooling unit 57: 170° C.

Temperature of lead-alloy slab 58 after cooled by cooling unit 57: 50° C.

Cooling speed of lead alloy: 5° C./sec or more

Thickness of lead-alloy slab 58 before rolling: approx. 12 mm

<Multistage Rolling Process>

Number (n) of rolling rollers 61: 8 pairs

Thickness of lead-alloy sheet 63 after multistage rolling: approx. 1 mm

Average rolling rate every passage between a pair of rollers $61a_n$ and $61b_n$: approx. 25%

Overall rolling rate: approx. 90%

<Expanding Process>

On the lead-alloy sheet 63, at predetermined positions, a plurality of parallel slits were cut in a staggered pattern, and the slits were then expanded, to obtain an expanded mesh 25 serving as a positive electrode grid 21. Part of the lead-alloy sheet 63 was left unexpanded, and worked into a tab 22 and a frame rib 23 of the positive electrode grid 21.

The positive electrode paste was filled into the expanded mesh 25, and aged and dried, to obtain an unformed positive electrode plate (length: 115 mm, width: 137.5 mm). This electrode plate was subjected to chemical formation in a below-described battery container, to obtain a positive electrode plate 2 comprising the positive electrode grid 21 retaining a positive electrode active material layer 24.

[Evaluation 1]

(Measurement of Lattice Constant)

A Pb—Ca—Sn alloy sheet after multistage rolling was used as a measurement subject, and the lattice constant of the lead alloy was measured by X-ray diffractometry (XRD). Here, RINT-TTRII available from Rigaku Corporation was used as an XRD meter, and a CuKα radiation with a wavelength of 0.154056 nm was used as an X-ray source. The XRD of the Pb—Ca—Sn alloy in the range of 2θ=20 to 90° was performed by parallel beam method. Subsequently, angle calibration was performed using a NIST standard sample (NIST660b, LaB$_6$) as an external standard sample, to determine the lattice constant, by a least squares method from the peaks attributed to the (111), (200), (220), (311), (222), (400), (331) and (420) planes of the lead alloy (cubic crystal system, space group: Fm-3m).

(Measurement of Vickers Hardness)

Pb—Ca—Sn alloy sheet after multistage rolling was used as a measurement subject, and the Vickers hardness of the Pb—Ca—Sn alloy was measured in accordance with JIS Z 2244. Here, NVK-E, available from Akashi Corporation was used as a measurement instrument.

<Corrosion Amount>

After a below-described endurance test in Evaluation 2, the battery was disassembled. The positive electrode plate taken therefrom was washed with water to remove the sulfuric acid content, and then, the positive electrode active material was removed to leave the positive electrode grid only. The positive electrode grid was immersed in an alkaline mannitol solution for approximately 12 hours, to remove the corrosion layer from the surface of the positive electrode grid. The corrosion amount was calculated from the changes in weight before and after the endurance test.

(2) Fabrication of Negative Electrode Plate

A negative electrode plate 3 as shown in FIG. 3 was fabricated as follows.

A raw material lead powder, water, dilute sulfuric acid (density: 1.40 g/cm$^3$), lignin and barium sulfate serving as an expander, and carbon black serving as an electrically conducting material were mixed in a mass ratio of 100:12:7.0:1.0:0.1, to obtain a negative electrode paste.

In the method as described above, a negative electrode grid 31 of Pb—Ca—Sn alloy having a tab 32, a frame rib 33, and as expanded mesh 35 was obtained. The tin content in the Pb—Ca—Sn alloy was adjusted to 0.25 mass %, and the calcium content to 0.07 mass %.

The negative electrode paste was filled into the expanded mesh of the negative electrode grid 31, and an unformed negative electrode plate (length: 115 mm, width: 137.5 mm) was obtained in a similar manner to the above. This electrode plate was subjected to chemical formation in a below-described battery container, to obtain a negative electrode plate 3 comprising the negative electrode grid 31 retaining a negative electrode active material layer 34.

(3) Fabrication of Lead Acid Battery

A lead acid battery 1 as shown in FIG. 1 was fabricated as follows.

The negative electrode plates 3 were each inserted inside a bag-shaped separator 4 made of a polyethylene microporous film, and then, the positive electrode plates 2 and the negative electrode plates 3 were alternately stacked one on another. Thereafter, the tabs 22 of the positive electrode grids 21 were welded to a positive electrode connecting member 10 (positive electrode strap 6, and positive electrode connector 8 or positive electrode post), and similarly, the tabs 32 of the negative electrode grids 31 were welded to a negative electrode connecting member 9 (negative electrode strap 5, and negative electrode connector or negative electrode post 7), to obtain an electrode plate group 11.

Subsequently, the electrode plate group 11 was placed, one by one, into six cell chambers 14 divided by partitions 13 of a battery container 12. The positive electrode connector 8 provided contiguously to the positive electrode strap 6 was connected to the negative electrode connector provided contiguously to the negative electrode strap 5 of the adjoining electrode plate group 11, so that the adjoining electrode plate groups 11 were connected to each other in series. In this example, the connections between the electrode plate groups were made via through-holes (not shown) provided in the partitions 13. A lead alloy having an antimony content of 2.7 mass % and an arsenic content of 0.27 mass % was used for the positive electrode strap 6, the positive and negative electrode connecting members, and the positive and negative electrode posts. A lead alloy having a tin content of 2.5 mass % was used for the negative electrode strap 5.

Next, a lid 15 was attached to the opening of the battery container 12, and a positive electrode terminal 16 and a negative electrode terminal 17 provided on the lid 15 were welded to the positive electrode post and the negative electrode post 7. Then, a predetermined amount of electrolyte was injected through liquid inlets provided in the lid 15, to perform chemical formation in the battery container. Subsequently, the density of the electrolyte was adjusted to a final density of 1.28 g/cm$^3$.

After the formation, vent caps 18 each having a vent hole for discharging gas generated inside the battery to outside were fixed into the liquid inlets. A lead acid battery of 55D23 type (12V-48 Ah) specified in JIS D5301 was thus obtained. In the finished battery, the electrode plate groups 11, the positive electrode strap 6, and the negative electrode strap 5 were entirely immersed in the electrolyte.

[Evaluation 2]

With respect to the above battery, light-load endurance test was performed in accordance with JIS D5301. For simplicity, the test ambient temperature was changed from 40° C. liquid phase to 75° C. gas phase, and the duration of 25 A discharge in charge-discharge cycling was changed from 4 minutes to 1 minute.

Specifically, in 75° C. environment, the test battery was discharged at a discharge current of 25 A for 1 minute, and then charged at a charge voltage of 14.8 V (maximum charge current: 25 A) for 10 minutes. This discharge and charge process was taken as one cycle and repeated. Every 480 cycles, the battery was discharged at a discharge current of 320 A for 30 seconds. The number of cycles repeated until the battery voltage at the 30$^{th}$ second in the 320 A discharge dropped to 7.2 V was referred to as the life number of cycles.

EXAMPLE 2

A lead acid battery was fabricated and evaluated in the same manner as in Example 1, except that the tin content in the Pb—Ca—Sn alloy was changed to 2.2 mass %.

COMPARATIVE EXAMPLE 1

A lead alloy obtained by slowly cooling (cooling speed: less than 1° C./min) the molten metal in casting was extruded at a temperature lower than its melting point from a slot of 12 mm wide. Subsequently, the lead alloy was subjected to multistage rolling, to shape it into a lead-alloy sheet. The lead-alloy sheet was then expanded in the same manner as described above, to obtain a positive electrode grid of Pb—Ca—Sn alloy. The tin content in the Pb—Ca—Sn alloy was adjusted to 1.4 mass %, and the calcium content to 0.05 mass %. A lead acid battery was fabricated and evaluated in the same manner as in Example 1, except for using the positive electrode grid thus obtained.

COMPARATIVE EXAMPLE 2

A lead acid battery was fabricated and evaluated in the same manner as in Comparative Example 1, except that the tin content in the Pb—Ca—Sn alloy was changed to 1.6 mass %.

COMPARATIVE EXAMPLE 3

A lead acid battery was fabricated and evaluated in the same manner as in Comparative Example 1, except that the tin content in the Pb—Ca—Sn alloy was changed to 1.8 mass %.

COMPARATIVE EXAMPLE 4

A lead acid battery was fabricated and evaluated in the same manner as in Example 1, except that the tin content in the Pb—Ca—Sn alloy was changed to 1.6 mass %.

The results are shown in Table 1. The corrosion amount is a relative value, relative to the corrosion amount in Comparative Example 4, which is taken as 100.

TABLE 1

|  | Sn (mass %) | Lattice constant (Å) | HV | Corrosion amount | Life number of cycles | Remarks |
| --- | --- | --- | --- | --- | --- | --- |
| Ex. 1 | 1.8 | 4.9469 | 12.2 | 33 | 5040 | Continuous casting |
| Ex. 2 | 2.2 | 4.9467 | 10.9 | 27 | 5520 | Continuous casting |
| Com. Ex. 1 | 1.4 | 4.9492 | 5.7 | 208 | 3360 | Extruding |
| Com. Ex. 2 | 1.6 | 4.9486 | 6.4 | 169 | 3600 | Extruding |
| Com. Ex. 3 | 1.8 | 4.9483 | 7.0 | 161 | 3840 | Extruding |
| Com. Ex. 4 | 1.6 | 4.9479 | 11.2 | 100 | 3840 | Continuous casting |

Table 1 shows that even using a lead alloy having a tin content of 2.3 mass % or less as in Examples 1 and 2, the lattice constant can be decreased to 4.9470 Å or less, and this results in drastically improved corrosion resistance. On the other hand, when the lattice constant is more than 4.9470 Å (Comparative Example 4), despite using a lead alloy subjected to continuous slab casting and multistage rolling under similar conditions to those in Examples 1 and 2, the corrosion resistance cannot be sufficiently improved. It is further noted that decreasing the lattice constant to 4.9470 Å or less results in a significantly increased Vickers hardness HV.

In Comparative Examples 1 to 3 using a lead alloy subjected to extrusion, the lattice constant was large, and the corrosion resistance was far inferior to that in Examples. The relationship between the tin content and the lattice constant in Comparative Examples 1 to 3 is shown in FIG. 5, along with those in Examples 1 and 2 and Comparative Example 4. FIG. 5 shows that, when using a lead alloy subjected to extrusion, even if the tin content would exceed 2.3 mass %, it is difficult to decrease the lattice constant to 4.9470 Å or less.

Furthermore, when using a lead alloy subjected to continuous slab casting and multistage rolling, there observed a tendency that the decrease rate of the lattice constant declined when the tin content exceeded 1.6 mass %. Based on the foregoing, it can be concluded that the most efficient range for decreasing the lattice constant is from 1.6 mass % (not inclusive) to 2.3 mass % (inclusive), when using tin in an amount below its solid-solubility limit.

INDUSTRIAL APPLICABILITY

A positive electrode grid for lead acid batteries according to the embodiments of the present invention has excellent corrosion resistance, and, therefore, can be suitably used for applications that require highly long cycle life. For example, it is preferably used as a vehicle power supply.

REFERENCE SIGNS LIST

1: lead acid battery, 2: positive electrode plate, 3: negative electrode plate, 4: separator, 5: negative electrode strap, 6: positive electrode strap, 7: negative electrode post, 8: positive electrode connector, 9: negative electrode connecting member, 10: positive electrode connecting member, 11: electrode plate group, 12: battery container, 13: partition, 14: cell chamber, 15: lid, 16: positive electrode terminal, 17: negative electrode terminal, 18: vent cap, 21: positive electrode grid, 22: tab of positive electrode grid, 23: frame rib of positive electrode grid, 24: positive electrode active material layer, 25: expanded mesh of positive electrode grid, 31: negative electrode grid, 32: tab of negative electrode grid, 33: frame rib of negative electrode grid, 34: negative electrode active material layer, 35: expanded mesh of negative electrode grid, 50: casting machine, 51: molten metal, 52: molten metal bath, 53: chute, 54: mold, 55: steel belt, 56a, 56b, 56c: driving roller, 57: cooling unit, 58: lead-alloy slab, 60: multistage rolling machine, 61: rolling roller, 63: lead-alloy sheet, 70: take-up unit, 62: trimming cutter

The invention claimed is:

1. A positive electrode grid for lead acid batteries, comprising
    a lead alloy containing calcium and tin,
    the lead alloy having a calcium content of 0.10 mass % or less,
    the lead alloy having a tin content of 2.3 mass % or less,
    the lead alloy having a lattice constant of 4.9470 Å or less.

2. The positive electrode grid for lead acid batteries of claim 1, wherein the tin content in the lead alloy exceeds 1.6 mass %.

3. The positive electrode grid for lead acid batteries of claim 1, wherein the lead alloy has a Vickers hardness of 8 or more.

4. A lead acid battery, comprising a positive electrode plate, a negative electrode plate, a separator interposed between the positive electrode plate and the negative electrode plate, and an electrolyte including an aqueous sulfuric acid solution, wherein
    the positive electrode plate comprises the positive electrode grid of claim 1.

* * * * *